United States Patent [19]
Hoffmann et al.

[11] 3,941,720
[45] Mar. 2, 1976

[54] METHOD OF PRODUCING A RANEY COPPER CATALYST AND THE CATALYST SO MADE

[75] Inventors: Karl H. Hoffmann, Sauk Village; Donald R. Anderson, Oswego, both of Ill.

[73] Assignee: Nalco Chemical Company, Chicago, Ill.

[22] Filed: June 28, 1974

[21] Appl. No.: 484,175

Related U.S. Application Data

[63] Continuation-in-part of Ser. No. 473,266, May 24, 1974, abandoned, which is a continuation-in-part of Ser. No. 405,874, Oct. 12, 1973, abandoned.

[52] U.S. Cl. ............ 252/463; 252/476; 260/561 N
[51] Int. Cl.² ..................... B01J 21/04; B01J 23/72
[58] Field of Search ............... 252/463, 476, 477 Q; 260/561 N

[56] References Cited
UNITED STATES PATENTS

| | | |
|---|---|---|
| 3,766,088 | 10/1973 | Yoshimura et al. ............ 260/561 N |
| 3,767,706 | 10/1973 | Habermann et al. ........... 260/561 N |

*Primary Examiner*—W. J. Shine
*Attorney, Agent, or Firm*—Hill, Gross, Simpson, Van Santen, Steadman, Chiara & Simpson

[57] ABSTRACT

An improved technique for making a Raney copper catalyst by contacting particulate copper/aluminum alloy particles with an aqueous solution containing dissolved therein both alkali metal hydroxide and polyhydroxylated carboxylic acid.

27 Claims, No Drawings

METHOD OF PRODUCING A RANEY COPPER CATALYST AND THE CATALYST SO MADE

RELATED APPLICATION

This application is a continuation-in-part of our earlier filed U.S. application Ser. No. 473,266, filed May 24, 1974 and now abandoned which in turn is a continuation-in-part of our earlier filed U.S. application Ser. No. 405,874, filed Oct. 12, 1973 and now abandoned.

BACKGROUND OF THE INVENTION

Raney copper catalysts are conventionally prepared by contacting a starting copper aluminum alloy in particulate form with aqueous alkali metal hydroxide to remove some portion of the aluminum present initially. The manner in which such contacting is conducted affects the properties of the resulting Raney copper catalyst in such reactions, for example, as the hydrolysis of acrylonitrile to acrylamide under aqueous liquid phase conditions conducted in the presence of such catalyst.

Apparently, Raney copper catalysts have heretofore always been prepared with attention being given primarily to aluminum removal. Apparently complete aluminum removal was heretofore sometimes believed to have been achieved and to be desirable for purposes of enhancing catalyst activity for this nitrile hydrolysis reaction; see, for example, Canadian Pat. No. 899,380, at p. 5, where the Kawaken Fine Chemicals Co. Raney copper catalyst is used. According to Kawaken Fine Chemical Co. trade literature, it appears that substantially complete aluminum removal is achieved in such catalyst.

The art theorizes that Raney catalysts can contain amounts of insoluble aluminates which are sufficient to adversely affect catalyst activity and life for whatever reason, and the art has described processing procedures alleged to remove such impurities; see for example, U.S. Pats. Nos. 2,673,189; 2,604,455; 2,950,260; and British Pat. Nos. 642,861 and 658,863.

It has heretofore been proposed to activate Raney alloys for use as fuel cell electrodes by using in the activating solution alkali metal tartrates or polycarbonxylates aliphatic amino compounds; see U.S. Pat. No. 3,235,513. See also U.S. Pat. No. 3,067,276 for a discussion of catalyst regeneration using citric acid.

Because of the limitations and short-comings observed for prior art Raney copper catalysts as respects catalyst initial activity and catalyst life, the art continues to seek improved Raney copper catalysts such as will be particularly suitable for use in such a nitrile hydrolysis reaction operated, for example, at rapid conversion rates and high conversion levels using a concentrated acrylonitrile/water feed.

So far as is known, no one has ever heretofore used gluconic acid and closely related materials in preparing a Raney copper catalyst. For one thing, the prior art teachings above indicated would clearly lead those skilled in the art away from this type of material. Thus, when the tricarboxylic hydroxylated citric acid and the dicarboxylic hydroxylated tartaric acid are each used to activate a Raney copper catalyst with caustic and the product catalyst is then evaluated for activity in the catalytic hydrolysis of acrylonitrile to acrylamide, it is found that the tricarboxylic citric acid is somewhat more effective in increasing catalyst initial activity over the caustic conventionally activated catalyst than is the dicarboxylic tartaric acid which leads to the tentative hypothesis that increase in degree of carboxylation in an additive promotes catalyst initial activity. This hypothesis would appear to be strengthened by the added fact that monocarboxylic hydroxylated acids when similarly evaluated as additives to promote Raney copper catalyst activity display little or no effectiveness over the use of aqueous caustic employed above for catalyst activation when evaluated for activity in the same catalytic hydrolysis of acrylonitrile to acrylamide.

Thus, lactic and glycolic acids offer no advantage or particular value as additives for activation with alkali metal hydroxide of a Raney copper catalyst. On the other hand, if hydroxylation is a key to additive effectiveness in promoting such desired good initial Raney copper catalyst activity (in such a catalyzed nitrile conversion) then such prior art still fails to teach or suggest this type of material. Glycolic and lactic all are monohydroxylated acids. While tartaric acid is dihydroxylated, it displays less activity as an additive used for catalyst promotion than does, for example, citric acid. Furthermore, even a tetrahydroxylated compound like pentaerythritol, when similarly evaluated as an additive for a Raney copper catalyst and the product catalyst used for such nitrile hydrolysis, displays inferior activation additive value compared to gluconic acid and materials closely related thereto.

Nothing in the prior art teaches or suggest gluconate type materials for use in alkali metal hydroxide activation of Raney copper catalysts.

BRIEF SUMMARY OF THE INVENTION

The present invention is directed to an improved process for preparing a Raney copper catalyst and to the resulting catalyst so prepared. The process involves contacting at a temperature below about 80°C. particles of a metal alloy comprised of copper and aluminum with an aqueous solution which has dissolved therein on a 100 weight percent total solution basis from greater than 0 to about 25 weight percent alkali metal hydroxide and from greater than 0 to about 25 weight percent, or the solubility limit thereof in water, whichever one thereof is lower, of at least one polyhydroxylated carboxylic acid compound. Preferred polycarboxylic acid compounds are represented by the formula:

$$HOCH_2—(CHOH)_n—COOH \qquad (1)$$

where $n$ can range from 3 through 6 as well as the alkali metal salts, the ammonium salt, and caustic hydrolyzable esters thereof (especially the lactones and the lower alkanol esters).

The catalyst so prepared characteristically and typically comprises from about 2 to 45 weight percent aluminum with the balance up to 100 weight percent being copper in any given catalyst. Minor quantities of other materials, such as oxygen, may be present. More preferably, such catalyst comprises, on a 100 weight percent total weight basis, from about 10 to 35 weight percent aluminum with the balance up to 100 weight percent thereof being copper. This catalyst characteristically and typically has an average particle size (diameter) in the range from about 0.001 to 0.5 inch, though larger and smaller particle sizes may be used if desired.

Because of the characteristically high initial catalytic activity, and also the characteristically long catalyst activity life, associated with the type of catalyst so prepared by the process of this invention, the present invention provides an improved catalyst which can be used under conditions of continuous and extended use to produce desired, economically significant, high conversion yields of a product, such as acrylamide from acrylonitrile by hydrolysis.

In addition, the process of this invention offers operating efficiencies and economies, particularly in fixed catalyst bed reactors adapted for continuous operation, which are believed to be greater than heretofore known in the art of Raney copper catalysts.

Other and further aims, objects, purposes, advantages, utilities, and features will be apparent to those skilled in the art from a reading of the present specification.

DETAILED DESCRIPTION

The catalyst of the present invention is a Raney copper catalyst which has been activated through contact with an aqueous composition containing therein dissolved alkali metal hydroxide and dissolved polyhydroxylated carboxylic acid. The starting material is a preformed binary metal alloy comprised of aluminum and copper in particulate form which contains a weight percent ratio of Al/Cu in the range from about 70:30 to 30:70 (preferably about 45:55 to 55:45, and most preferably about 50:50).

In general, no particular special conditions need be employed when contacting starting alloy particles with an aqueous solution of alkali metal hydroxide and polyhydroxylated carboxylic acid. Typically, the alloy starting material is, as indicated, in the form of particles ranging in size from about 0.001 to 0.5 inch. Preferably, this solution comprises from greater than 0 to about 5 weight percent compound of formula (1), and with the balance up to 100 weight percent thereof being water, total by-product free (aluminate free) composition basis. More preferably, such a solution comprises from greater than 0 to about 5 percent alkali metal hydroxide, from about 0.01 to about 1.0 weight percent compound of formula (1), and with the balance up to 100 weight percent thereof, total by-product free basis, being water, though some aluminate may be present with other by-products. Preferably, the process of contacting with such a solution is conducted while maintaining the reaction zone in the region of the particles being activated into Raney copper catalyst at a temperature in the range of from about 0° to 80° C. Preferably, the contacting time ranges from about ½ to 30 hours. More preferably, the contacting temperature is in the range of from about 30° to 60° C. More preferably, the contacting time is adjusted to be in the range of from about 4 to 12 hours.

The Raney copper catalyst should have at least about 25 weight percent of the initially present aluminum in such alloy particles removed during alkali contacting; however, it is apparently not necessary to remove aluminum from a catalyst during activation thereof by contacting such with a mixed solution of alkali metal hydroxide and compound of formula (1), as taught by this invention.

In one preferred and exemplary plant operational mode of catalyst preparation, activation of such starting alloy is accomplished by first contacting an aqueous solution of at least one compound of formula (1) with a group of such alloy particles. This aqueous solution can contain dissolved therein from about 0.01 to 1.0 weight percent of compound of formula (1) (total solution basis). Conveniently, the particles are preferably initially immersed in water and the compound(s) of formula (1) is (are) added to such water of immersion until the desired concentration of such compound(s) is (are) obtained. Such alloy particle group has an average particle size (diameter) in the range from about 0.001 to 0.5 inch, and such copper alloy preferably has a copper to aluminum weight ratio of from about 45:55 to 55:45. This aqueous solution prefeably has a temperature in the range from about 30° to 60° C. during contacting. The time of such first contacting is relatively unimportant, though times of from about 5 minutes up to several hours have been found to be convenient.

Secondly, one contacts the resulting said group of alloy particles with an aqueous caustic (alkali metal hydroxide) solution. Conveniently, the caustic (alkali metal hydroxide) is added to (and dissolved in) the previously utilized solution of compound of formula (1) while continuous contact of such solution with such particles is maintained. Such second contacting is accomplished over a total time interval of from about ½ to 30 hours, and such caustic solution is added gradually to said group over said time interval. The contact rate or addition rate of starting caustic solution being added to said group of particles during such contacting typically ranges from about 0.01 to 10 pounds caustic per pound of said starting group of alloy particles per hour. The total quantity of caustic so added to the aqueous medium in the reaction zone is typically in the range of from about 0.5 to 25 pounds of caustic per pound of said group of particles (dry weight basis). During such contacting, such aqueous caustic solution and the resulting aqueous medium produced in such contacting each have a temperature in the range from about 0° to 80° C. During such second contacting, said group of particles is thus maintained in contact with at least one compound of formula (1). Preferably at least about 25 weight percent (total starting weight basis) of this aluminum initially present is removed during such a contacting operation conducted in accord with the teachings of this invention during the course of such an initial catalyst operation using fresh starting alloy particles.

While some alkali metal hydroxide during the contacting characteristically reacts with the aluminum of the alloy particles, the manner in which a compound of formula (1) functions in the practice of the present invention is presently unknown. One theory (and there is no intent herein to be bound by theory) is that a compound of formula (1) functions as a sequestering or stabilizing agent which present the precipitation of solid particles of alumina (or derivatives) on the surface or in the pores of the catalyst, a theory which may be supported by U.S. Pat. No. 2,345,134 where polyhydroxylated compounds apparently act as stabilizing agents for sodium aluminate. Particles previously contacted with an alkali metal hydroxide solution may advantageously be post-contacted with an aqueous solution of aliphatic hydroxylated hydrocarbon compound using concentrations as taught herein.

After such second contacting, the resulting group of Raney copper catalyst particles is preferably washed to separate therefrom any remaining formula (1) compound, the remaining unreacted caustic and aluminate. Thereafter, the so-washed group of particles may optionally interveningly be stored before being used in a subsequent catalytic process.

For example, such a subsequent catalytic precess can be a hydrolysis process which preferably involves contacting such particles of Raney copper catalyst with an aqueous composition comprising, for example, from about 30 to 40 weight percent acrylonitrile with the remainder to 100 weight percent thereof being water while maintaining a temperature of, for example, from about 70° to 125° C., as indicated.

Examples of formula (1) compounds include gluconic acid, sodium gluconate, ammonium gluconate, glucono delta lactone and the like.

In addition to the polyhydroxylated carboxylic acids indicated, one can employ acids and esters thereof which will form in alkaline water solution the same anions as do the corresponding acids themselves, the anions being preferably of the type within the scope of formula (1). Preferred such acids have a solubility in water of at least about 5 weight percent. Generally, such acids have a molecular weight less than about 1000 and preferably less than about 500, and, when repeating or condensed molecules are combined in a single molecule, no more than a dimer or trimer is used.

Most preferred compounds of formula (1) are gluconic acid, glucono delta lactone, and sodium gluconate. A presently most preferred alkali metal hydroxide is sodium hydroxide.

The exact amount of additive material used in a given catalyst activation performed in accord with the teachings of this invention can vary over relatively wider ranges as indicated. When a catalyst activation procedure using a particular additive material is being optimized so as to produce, for example, a catalyst having maximized control activity, it can be borne in mind that apparently each additive has its own particular optimized concentration level above which further increases thereof may result in no substantial further increase in product activated catalyst activity, as data presently available suggests. Indeed, at relatively high concentrations, at least some additive material may cause such reactions or other (presently unknown) effects to occur which exert an adverse influence upon a given activation procedure. Thus, as those skilled in the art will appreciate, it is practically impossible to express for each additive a broad usable range or an optimized use range. In general, lower as opposed to higher concentrations of an additive material are preferred for reasons of economy and general effectiveness in commercial activation procedures.

Those skilled in the art will readily appreciate that any convenient procedure or technique may be employed for contacting starting copper/aluminum alloy particles with an aqueous mixture of alkali metal hydroxide and formula (1) compound. The starting alloy particles can be added to a starting mixture composition, or vice versa, or otherwise as desired. While pretreatment of particles of alloy with a starting mixture comprising an aqueous solution of compound of formula (1) is more convenient, such is not necessary. A preformed Raney copper catalyst conventionally prepared by alkali contact can be post treated, if desired, with a starting solution comprised of alkali metal hydroxide and formula (1) compound in accord with the teachings of this invention, particularly when optimized catalyst performance is not needed. It is preferred to activate a catalyst as taught herein for use in this invention under conditions such that the metal particles are subjected to a minimum of heat exposure, such as is generated when, for example, concentrated aqueous alkali metal hydroxide contacts the starting alloy particles. It is preferred to activate a catalyst as taught herein for use in this invention using temperatures which do not exceed about 80° C., and by using controlled incremental or continuous addition of alkali metal hydroxide over an extended time period to an aqueous medium being used to activate a group of particles.

One can conveniently employ, during catalyst activation, a total quantity of aqueous hydroxide, for example, such that the molar quantity of hydroxide used totals from about 0.25 to 2.0 (preferably 1.1 to 2.0) times the toatl molar amount of aluminum initially present in a starting group of alloy particles, as when a batch preparation procedure is being employed, where the aqueous hydroxide is being added to a vessel containing a fixed quantity of starting alloy with aqueous formula (1) compound and the aqueous hydroxide leaching composition being allowed to accumulate in this vessel during the leaching operation.

During the contacting of starting alloy with such a leaching composition, an aluminate (in solution) and hydrogen gas are characteristically produced. Conveniently, the hydrogen gas is vented more or less at the rate generated from the reaction zone, and most of the aluminate may be removed in the water of the laching composition, if desired. It is preferred to conduct the activation operatiion under inert conditions, such as under a blanket of nitrogen gas or a gas of the helium family, primarily to avoid forming explosive mixtures of hydrogen and oxygen.

At the end of a contacting operation by the teachings of this invention, the resulting solid catalyst particles remaining are preferably washed with water preferably to a neutral pH (e.g. a pH in the range of from about 7.0 to 7.5). The product catalyst is then removed from the reaction zone, and wet-screened to separate fines, preferably.

The product catalyst is conveniently stored under water, as in drums, prior to charging to a reactor for use in the practice of the process of the present invention. Keeping the catalyst under water prevents oxidation by air which occurs rapidly if the catalyst is allowed to have oxygen exposure.

When practicing the process of the present invention to make a Raney copper catalyst for use in a suspension reactor bed system, it is preferred to employ the Raney copper catalyst in the form of particles at least 90 weight percent of which are in an average size range from about 0.002 to 0.100 inch. Similarly, when the present invention is used to make a Raney copper catalyst for use in a fixed bed system, it is convenient and preferred to use the Raney copper catalyst in the form of particles at least 90 weight percent of which range in average size from about 0.02 to 0.50 inch.

In one more preferred catalyst preparation procedure, using the preferred route above described, the said group of alloy particles is confined to a reaction zone. A caustic solution and a solution of formula (1) compound may be admixed and contacted with said group of particles in said zone, but the resulting aqueous medium is gradually removed from the zone during the contacting. In another more preferred catalyst preparation procedure, using the preferred route above described, the said resulting aqueous medium is so removed at a volumetric rate which is about equal to the rate of addition of said caustic solution. In such a removal procedure, substantially 100 weight percent of this so removed resulting aqueous medium can be recycled back into contact with the group of particles being activated. During such a recycle, the so recycled aqueous medium is admixed with at least a portion of fresh caustic solution before or during recycle contact with such a group of particles.

Alternatively, less than 100 weight percent of said so removed resulting aqueous medium can be recycled back into contact with said group of particles. The balance up to 100 weight percent thereof is permanently removed from said reaction zone and can be discarded. Caustic may be added to such reaction zone at a rate approximately equal to the rate at which caustic is consumed through reaction with the aluminum in the alloy. The contacting process involving caustic addition may preferably be practices continuously at a rate which is approximately equal to the rate of caustic consumption. The amount of aluminum left in the catalyst after an activation, as described herein, can vary widely, but in the case of an active catalyst used for fixed bed catalysts, it has been found that as much as 20 weight percent aluminum (based on total catalyst weight) can be present in a catalyst without apparently affecting catalyst use and performance characteristics, such as conversion rate, throughput rate of reactants, catalyst life, catalyst activity, etc., a fact which is somewhat surprising in view of the prior art above reviewed. Formula (1) compound can be added with caustic.

In preparing a catalyst of this invention, it will be appreciated that there apparently is a sensitive relationship between the temperature of activation and the time of caustic contact with starting alloy. In general, the higher the temperature, the longer should be the time for caustic addition to provide a most active catalyst, because under such conditions localized overheating of the catalyst particles is avoided or reduced to a minimum level. Localized overheating of alloy particles may interfere with generation of a catalyst having an optimum desired group of characteristics associated therewith. If one employs a rapid reaction between alloy particles and alkali, there tends to be produced a lessening of catalyst activity. A surprising amount of heat is liberated when one contacts alloy particles with caustic so that on a large scale of catalyst activation, refrigeration equipment could be used to remove the exotherm.

As used herein the term "gradual" includes not only conditions, but also intermittent addition of alkali to alloy particles or removal of a resulting aqueous medium from the zone of a given activation reaction.

Even after a great portion of removable aluminum in particles has been etched away by caustic, as in a conventional Raney copper catalyst activation procedure, one can still obtain a benefit (improved catalyst activity in the hydrolysis process of this invention) by contacting such particles with a solution of alkali metal hydroxide and compound of formula (1) in accord with the teachings of this invention. Hence, a starting alloy material in particulate form for purposes of this invention can be one which has previously undergone a contacting with alkali metal hydroxide using, for example, prior art Raney copper catalyst activation technology. The beneficial results achieved by a contacting conducted in accord with the invention are characteristically producible even when using an aqueous treating or contacting medium wherein the concentration of alkali metal hydroxide and of compound of formula (1), respectively, is very low. Though as those skilled in the art will appreciate, one can employ, as taught herein, relatively high such concentrations, low such concentrations are preferred during a contacting operation as taught herein. Mixture of different ones of the additives taught herein may sometimes be advantageously employed during contacting.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

Activation of Alloy to Raney Copper Catalyst

A leaching reaction to activate a 50:50 weight ratio copper aluminum alloy is carried out using an apparatus arrangement where a group of particles are confined to a reaction zone and an alkali metal hydroxide solution is added into the reaction zone. The liquid is added to the reaction zone and is allowed to accumulate in the reaction zone. At the end of such caustic addition, in accordance with a preferred catalyst activation procedure of the present invention, and after caustic addition is terminated, the resulting treated particles are removed from the reaction zone. The particles are initially wet with water before caustic addition is commenced. The alloy, which is in the form of particles ranging in size from about 0.06 to 0.25 inch average diameter size, is placed in a wire basket which is rotated in a 1 to 3 liter reaction flask. The flask is provided with a nitrogen purge inlet, a buret for caustic addition, a thermometer and a hydrogen outlet connected to a Wet Test Meter. Circulation of the leaching solution is accomplished by using a turbo-agitator in the flask beneath the basket.

After the alloy is placed in the basket mounted in the reactor flask, sufficient deionized water is added to the flask to completely immerse all particles and the agitator is set for about 120 r.p.m. Heating to a reaction temperature of 105° F. is undertaken concurrently with a 30 minute nitrogen purge. Prior to the addition of the caustic solution an aqueous solution of gluconic acid, 50% by weight at ambient temperature, is added to the water. The resulting aqueous solution of gluconic acid is estimated to contain from about 0.1 to 0.3 weight percent gluconic acid. The total amount of acid thus added is about 0.01 grams of acid per gram of alloy, on a dry basis.

When the flask reaches 105° F. and the purge is completed, a 50 weight percent sodium hydroxide solution is added continuously over a 380 minute period to the system until 3 pounds of sodium hydroxide solution per pound of alloy have added, while controlling the temperature within ± 2° F. with external cooling.

Contacting with the sodium hydroxide solution is continued until an estimated amount of about 80 to 90 weight percent of the total aluminum present in the starting alloy has been leached, based on hydrogen evolution. The reaction rate is evaluated by monitoring the hydrogen evolution every 15 to 30 minutes. Thereafter, the product catalyst is immediately removed from the leaching solution and placed into a large excess of deionized water. The product catalyst is rinsed with deionized water until the pH of the rinse water approaches 7.0 after which the product catalyst is stored under deionized water to prevent oxidation thereof.

EXAMPLE 2

Activation of Alloy to Raney Copper Catalyst

A leaching reaction using an apparatus arrangement similar to that used in Example 1 but equipped with a drain arrangement which permits one to remove gradually from the vicinity of the group of particles in the reaction zone the medium which results after the alkali metal hydroxide solution and the formula (1) compound solution have each been brought into contact with the group of particles therein to activate a 50:50 weight ratio copper aluminum alloy is performed using a ½ inch outside diameter semi-batch fixed bed reactor. The reactor is provided with a nitrogen purge inlet, a buret for caustic addition, a thermometer, and a hydrogen outlet connected to a Wet Test Meter.

At the bottom of the reactor a 3 to 4 inch bed of 4 mm glass beads are initially placed, and on top of this bed is positioned a charge of starting alloy, which is in the form of particles ranging from about 0.06 to 0.25 inch average diameter. A second bed of similar bead thickness is then placed on top of the alloy charge in the reactor. Then deionized water at ambient temperature is circulated through the bed while the reactor is being heated to 105° F. Immediately after heating is commenced, an aqueous solution of 50 weight percent gluconic acid at ambient temperature is added to the circulating water solution at a level sufficient to produce a ratio of 0.001 grams gluconic acid per gram of alloy in the reactor; such addition is continued during this entire activation procedure during subsequent caustic solution addition to the reactor.

Circulation of the laching solution is accomplished by pumping a 1% caustic solution (dry basis) at a rate of 0.1 grams caustic per gram alloy per hour and allowing the resulting aqueous medium to be removed from the reactor at a rate approximating the pumping rate. A liquid level, sufficient to immerse the alloy and resulting catalyst, is maintained during the activation with a liquid leg device so that greater heat transfer capabilities may be obtained.

When the unit reaches 105° F., the caustic solution, containing added gluconic acid in solution at a concentration estimated to be from 0.01 to 0.03 weight percent, is added until a total charge of about 3 grams of caustic per gram of alloy has been contacted with the alloy. The circulation rate is thus about 10 grams resulting solution per gram of alloy particles per hour. The reaction is continued until about 80 to 90 weight percent of the total amount of aluminum estimated to be present in the starting alloy has been leached, based on hydrogen evolution. The reaction rate is evaluated by monitoring the hydrogen eveolution every 15 to 30 minutes.

The resulting product catalyst is then washed with deionized water until the pH of the wash water reaches the range of from about 7 to 7.5. The product catalyst is then retained under water to prevent oxidation.

EXAMPLE 3

Activation of Alloy to Raney Copper Catalyst

A leaching reaction using an apparatus arrangement similar to that used in Example 1 except that here, after the caustic solution from a first conduit has contacted the group of particles, the resulting aqueous medium is gradually removed through another conduit. In such other conduit, this resulting aqueous medium is conveyed to a connection region where such other conduit is interconnected with a third conduit. Fresh caustic solution and fresh compound of formula (1) are each conveyed to and mixed with the aqueous medium in such other conduit so that a mixture of the aqueous medium and fresh caustic solution and fresh compound of formula (1) solution results, which mixture is then conveyed through the first conduit back into the reaction zone. Such a system permits economical use of caustic, as those skilled in the art will appreciate. In this way, a 50:50 weight ratio copper/aluminum alloy is activated using a ½ inch outside diameter semi-batch fixed bed reactor. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the fixed bed reactor.

At the bottom of the reactor a 3 to 4 inch bed of 4 mm glass beads are placed on top of which is positioned a charge of starting alloy, which is in the form of particles ranging from about 0.06 to 0.25 inch average diameter. A second bed of similar bead thickness is placed on top of the alloy charge in the reactor. Thereafter, deionized water is circulated through the bed while the reactor is being heated to 105° F. Thereafter, an aqueous solution of 50 weight percent gluconic acid at ambient temperature is added to the water in a quantity to provide about 0.01 grams of gluconic acid perr gram of alloy. The resulting aqueous gluconic acid concentration is estimated to be from 0.1 to 0.3 weight percent.

When the unit reaches 105° F., a 50 weight percent sodium hydroxide solution is begun to be added at a rate of about 0.2 grams sodium hydroxide per gram of alloy per hour until a total charge of about 2.0 grams of such sodium hydroxide solution have been added per gram of alloy. Using a medium circulation rate similar to that employed in Example 2, the reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 4

Activation of Alloy to Raney Copper Catalyst

A leaching reaction using an apparatus arrangement similar to that of Example 1, except that here caustic solution and compound of formula (1) are gradually added into the reaction zone through a conduit and after the caustic solution and formula (1) compound solution from this conduit have contacted the group of particles, the resulting aqueous medium is gradually removed through another conduit from which a portion of the resulting medium is removed from the system before the remainder thereof is recycled back to the reaction zone. Fresh caustic solution and fresh formula (1) compound solution are mixed with the aqueous medium being recycled so that a mixture results, which mixture is passed into the reacton zone. Thus, a 50:50 weight ratio copper/aluminum alloy is activated using a ½ inch outside diameter semi-batch fixed bed reactor. The reactor is provided with a nitrogen purge inlet, a buret for caustic addition, a thermometer, and a hydrogen outlet connected to a Wet Test Meter. Circulation of the leaching solution is accomplished by using a pump that is connected in a closed loop to the bed reactor.

At the bottom of the reactor a 3 to 4 inch bed of 4 mm glass beads are placed on top of which is positioned a charge of starting alloy, which is in the form of particles ranging from about 0.06 to 0.25 inch average diameter. A second bed of similar bead thickness is placed on top of the alloy charge in the reactor. Thereafter, deionized water at ambient temperature is circulated through the bed while the reactor is being heated to 105° F. Immediately after heating is commenced an aqueous solution of 50 weight percent gluconic acid solution is added at ambient temperature to the water in a quantity to provide about 0.01 grams of gluconic acid per gram of alloy. The resulting aqueous gluconic acid concentration is estimated to be from 0.1 to 0.3 weight percent. When the unit reaches 105° F., a 50 weight percent sodium hydroxide solution containing added gluconic acid in solution at a concentration estimated to be from 0.01 to 0.03 weight percent, is added at a rate of 0.2 grams of sodium hydroxide solution per gram of alloy per hour until a total charge of about 3.0 grams of such sodium hydroxide solution have been added per gram of alloy. A circulation rate similar to that of Example 2 is employed. During such sodium hydroxide addition, a portion of the resulting aqueous medium is removed from the system at a rate of 0.25 grams per hour per gram of alloy.

The reaction is continued until about 80 to 90 weight percent of the total amount of aluminum estimated to be present in the starting alloy has been leached, based on hydrogen evolution. The reaction rate is evaluated by monitoring the hydrogen evolution every 15 to 30 minutes.

The resulting product catalyst is then washed with deionized water until the pH of the wash water reaches the range of from about 7 to 7.5. The product catalyst is then retained under water to prevent oxidation.

EXAMPLE 5

Hydrolysis Process

The catalyst prepared according to the procedure of Example 1 is packed into a 12 inch continuous acrylonitrile hydrolysis reactor so as to form a fixed catalyst bed therein, the catalyst being covered with water during the charging operation to avoid oxidizing same. The reactor is sealed and pressure checked.

Water at the rate of 3.7 ml per minute and acrylonitrile at the rate of 1.5 ml per minute are charged to the reactor and the reactor temperature is raised to 175° F. When the reactor reaches 175°F and the flow rates are lined out, a one hour conditioning period is undertaken to insure that the system is equilibrated. A test is then started and a composite sample of the product stream is taken after 60 minutes followed by a second composite sample at the end of the next 30 minutes to check for possible variations.

Thereafter the water feed rate is reset to 2.65 ml per minute and the acrylonitrile feed rate is reset to 1.1 ml per minute. The unit is allowed to equilibrate for 30 minutes, and then a sample of the product is taken in the same manner as done previously.

The samples are submitted to gas chromatographic analysis for determination of water, acrylamide, and acrylonitrile content. Samples that are two phased are dissolved in methanol to yield a single phase sample for this analysis. The shut-down procedure requires cooling the reactor, terminating the nitrile feed, and flushing the reactor with water to remove any residual nitrile.

The catalyst evaluated in this procedure is compared with other catalysts produced using the process of example 1 with modifications as shown in Table 1. Evaluation of the catalysts provided information relating the relative activity of catalyst to the process condition under which the catalyst is prepared. The aforementioned relative activity is based on the concept that under a specific set of reactor operating conditions, e.g., temperature, feed contact time, acrylonitrile concentration in the feed, the same conversion level of acrylonitrile to acrylamide is obtained by varying the weight of catalyst present in the reaction zone. The ratio of the weight of catalyst required, to obtain the same conversion level of acrylonitrile to acrylamide as obtained with the catalyst assigned an activity of 1.0, to the weight of catalyst an activity of 1.0, is the reciprocal of the catalyst activity. To illustrate, if the catalyst arbitrarily assigned an activity of 1.0 requires 50 grams of catalyst to obtain a conversion level of acrylonitrile to acrylamide of about 80% and a second catalyst requires 25 grams of catalyst to effect the same conversion of acrylonitrile to acrylamide of about 80%, then the reciprocal of the relative activity of the latter catalyst is 25 grams/50 grams = 0.5, and thus the relative activity is 1/0.5 = 2.0. Use of this analysis under the operating conditions described in this example provides the relative activity value of catalysts produced under various operating conditions using the activation process of Example 1. The results are summarized below in Table 1. The aforementioned relative activity is measured by the procedure described in Example 8 (parts a–n). When each of the catalysts prepared by the teachings of Examples 2,3 and 4 is used in the hydrolysis reaction in the manner just described, similar results are obtained. The information contained in Table 1 demonstrates the vast difference in generating a catalyst as defined in this invention when compared to a catalyst activated by the method thereinabove referred to as the Kawaken method. It is evident to those familiar with the art that the relative activity of a catalyst activated by the method claimed in this invention is significantly more active, i.e., by a factor of 4 to 7 times as active, as a catalyst prepared by the Kawaken method.

TABLE 1

| Catalyst | CATALYST Tyler Sieve Size Range | Activation Temperature | % NaOH (4) | NaOH addition time (3) | grams Gluconic acid per 100 grams of alloy | Comments (5) | CATALYST ACTIVITY Relative to the standard basis-dimension less |
|---|---|---|---|---|---|---|---|
| a | 6–8 mesh | 85°F | 20% | 0 | 0.00 | Prepare catalyst using method described by Kawaken Chemical Company (2) | 1.00 |
| b | 6–8 mesh | 85°F | 20% | 94 min. | 0.00 | Prepare catalyst using method claimed in this invention (1) | 3.15 |
| c | 6–8 mesh | 105°F | 10% | 135 min. | 1.33 |  | 4.96 |
| d | 6–8 mesh | 105°F | 10% | 381 min. | 5.32 |  | 7.63 |
| e | 6–8 mesh | 85°F | 10% | 381 min. | 5.32 |  | 7.82 |

FOOTNOTES FOR TABLE 1
1. The catalysts (b),(c),(d) and (e) are prepared according to the method taught in Example 1, except that the activation temperatures, percent NaOH, NaOH addition time, and grams gluconic acid per 100 grams of alloy are varied as summarized in this Table.
2. Catalyst (a) is prepared by the method described by Kawaken Chemical Company, in which the alloy particles are incrementally added over a 1.5 hour period to an agitated solution to which all of the sodium hydroxide has been added prior to adding the alloy particles. After adding all alloy particles, the particles and sodium hydroxide are contacted for an additional 2½ to 3 hours before removing the particles from the sodium hydroxide solution and washing them free of excess caustic.
3. In all cases, 2.5 to 3.0 grams of 50% sodium hydroxide solution per gram of alloy are added to the reactor flask over the indicated NaOH addition time.
4. Percent NaOH is calculated as: $\dfrac{W(0.5)}{S+W}$ where W is the weight of 50% NaOH solution added to the reactor flask, and S is the weight of water initially present in the reactor flask just before starting the addition of the NaOH solution to the reaction flask.
5. Catalyst (b) is inferior to catalysts (c),(d) and (e) because of the presence of the gluconic acid during catalyst activation in catalysts (c),(d) and (e).

EXAMPLE 6

Hydrolysis Process for Testing Catalyst Life

A system for hydrolyzing acrylonitrile to acrylamide is a reactor in the design of a double pipe heat exchanger with a flow system as indicated in FIG. 2. The inner tube which constitutes the reaction zone which has a 5-foot length and is formed of 316 stainless steel and has 1 in. outside diameter schedule 10S pipe. The inner tube is uniformly surrounded by a jacket which is provided with an inlet at the bottom of the jacket and also with an outlet at the top of the jacket to allow circulation of a heat transfer medium to remove heat generated from the reaction. A temperature sensing device is installed in the inner pipe to allow temperature measurements throughout the reaction zone.

During operation of the reactor, acrylonitrile and water are separately pumped from volumetrically calibrated feed tanks, combined, heated, and introduced into the bottom of the reactor. The reactor is maintained under pressure to allow maintaining liquid phase conditions. In this Example, the following process conditions apply to the operation in test of a catalyst prepared in the manner of Example 1, except that 0.053 grams of gluconic acid per gram of alloy are initially added to the water and approximately 4.1 grams of 50% NaOH solution are added per gram of alloy over a 5-hour period, and also except that the metal particles are not placed in a basket but are deposited on the bottom of the reaction vessel.

| | | |
|---|---|---|
| Reactor temperature | 220° ± 2.0°F | |
| Weight percent acrylonitrile in the feed | 35 ± 1.0% | |
| Weight hourly space velocity | 2.0 ± 0.3 | pounds of feed per pound of catalyst per hour. |

As previously mentioned, the catalyst here used is a nominal 50% copper, 50% aluminum alloy activated in the manner described in this invention. A quantitative analysis of this catalyst after activation indicates that the activated catalyst composition is 81 weight percent copper and 19 weight percent aluminum. The catalyst, which is in the form of particles ranging in size from about 0.06 to 0.125 inch in diameter, is typical of other catalysts prepared as taught herein and evaluated in the process of this invention.

Product leaving the reactor is cooled before being reduced to atmospheric pressure. Such product is collected in a final receiver and analyzed for acrylamide, acrylonitrile and water content. Based on these respective analyses, conversion level of acrylamide, and activity of the catalyst at a particular point in time is determined by the method of Example 8 (a–n).

The initial activity of the catalyst is determined to be 7.1. After about 500 hours of operation at the described test conditions, catalyst activity remains at 7.1, within experimental error. After approximately 1700 hours of operation at the described test conditions, the catalyst activity is determined to be 4.7.

EXAMPLE 7 (PARTS A THROUGH H)

A series of 8 different Raney copper catalysts are prepared using the following standarized procedure.

A three-liter reaction flask is provided with a nitrogen purge inlet, a buret for caustic addition, a thermometer, and a hydrogen outlet connected to a wet test meter. A basket is attached to a motor-driven agitator shaft so that the basket can be rotated inside the reaction flask during the activation procedure.

A total of 200 grams of copper/aluminum alloy particles are placed inside of the basket. The particles are between 6 and 8 Tyler mesh in size, and they are approximately 50% aluminum and 50% copper on a weight percentage basis. A total of approximately 2650 grams of deionized water and a preselected amount of an organic additive are charged to the flask. The flask is subsequently closed and purged with nitrogen to prevent forming an explosive gas mixture during activation. A total of 662 grams of a 50% by weight solution of sodium hydroxide in water are added to the flask incrementally over approximately a four-hour period.

After completing the sodium hydroxide addition, the mixture is held for an additional time period sufficient to allow a total of 4.2 to 4.7 cubic feet of hydrogen to evolve from the flask, as measured by the wet test meter. During the sodium hydroxide addition and the subsequent hold period the temperature of the liquid is maintained between 40° and 43° C. The basket containing the metal particles is rotated inside the liquid during the sodium hydroxide addition and subsequent hold period. After completing the activation procedure, the resulting Raney copper catalyst particles are washed repeatedly with water until the washings show a pH which is less than eight. Fines are removed by wet screening on a 10 Tyler mesh screen and subsequently are stored under water prior to testing for acrylonitrile hydration activity.

A total of 6 different organic additives are individually tested using the preceding procedure. The additives tested are (a) gluconic acid; (b) lactic acid; (c) malic acid; (d) malonic acid; (e) tartaric acid; (f) glycolic acid; (g) citric acid; and (h) gluconic acid. A blank or control catalyst test (designated (i) is )) in which no additive is added to the catalyst preparation reaction vessel. Results are summarized in Table 2.

EXAMPLE 8 (PARTS A THROUGH I)

The 9 catalysts (8 with additives) prepared in Example 7 are each tested for acrylonitrile hydration activity by using the following standardized procedure.

A total of 80.6 grams of wet catalyst are charged to a reaction tube which has been fabricated from ¾ inch diameter pipe. The reaction tube is immersed in a hot water bath which is used to control temperature inside the tube, as measured by thermocouples which are enclosed inside a thermowell which projects into the reaction tube from one end.

When this reactor is used to determine activity of a catalyst, acrylonitrile and water are separately pumped from volumetrically calibrated feed tanks, combined, heated, and introduced into the bottom of the reactor. The reactor is maintained under pressure as necessary to allow maintaining liquid phase conditions. Product leaving the reactor is cooled before reducing pressure to atmospheric. Product is collected and analyzed by gas chromatography for weight % acrylamide, acrylonitrile and water. From this analysis the percent conversion of acrylonitrile to acrylamide is estimated.

For each catalyst, a series of different tests are run at different contact times with all other variables held constant, as follows:

1. Arithmetic mean catalyst bed temperature of approximately 175° F.
2. Feed composition 100% basis of 25 weight % acrylonitrile and 75 weight % water.

Contact time is inversely measured as weight hourly space velocity (WHSV), which is defined as weight hourly feed rate divided by dry catalyst weight in the reaction zone.

The contact times are varied to bracket a 35% conversion of acrylonitrile to acrylamide. The WHSV required for a 35% conversion is estimated by graphical or statistical interpolation. The catalyst activity (a) is then calculated from the following expression:

$$a = 1.2 \, (WHSV_{35})$$

where $WHSV_{35}$ is the weight hourly space velocity required for 35% conversion of acrylonitrile to acrylamide.

The activities determined by the preceding procedure for the catalysts prepared in Example 7 are tabulated in Table 2.

TABLE 2

| Additive | Additive Level (percent based on alloy charge) | Additive Concentration in Solution* (% by Wt.) | Catalyst Activity |
|---|---|---|---|
| (a) gluconic acid | 2.5 | 0.15 | 6.2 |
| (b) lactic acid | 2.5 | 0.15 | 2.8 |
| (c) malic acid | 2.5 | 0.15 | 3.7 |
| (d) malonic acid | 2.5 | 0.15 | 3.1 |
| (e) tartaric acid | 2.5 | 0.15 | 4.2 |
| (f) glycolic acid | 2.5 | 0.15 | 3.2 |
| (g) citric acid | 1.25 | 0.08 | 4.3 |
| (h) gluconic acid | 33 | 2.0 | —** |
| (i) blank - no additive | 0 | 0 | 3.2 |

*After NaOH addition is complete, on an aluminate-free basis.
**Dash marks indicate that though particular product catalyst was prepared with indicated additive, the particular product catalyst was not evaluated to determine catalyst activity as respects conversion of acrylonitrile to acrylamide.

EXAMPLE 9

A catalyst first is prepared in the same manner as described in Example 7 but, without adding any additive to the reaction flask prior to or during the sodium hydroxide addition period.

Then this catalyst is treated as follows: A clean reaction flask as described and equipped in Example 7 is filled with approximately 2650 grams of deionized water, 662 grams of a 50% aqueous sodium hydroxide solution, and 10 grams of a 50% gluconic acid solution. The previously prepared Raney copper catalyst is charged into the basket which is immersed into this resulting solution and the basket is rotated in the solution for 3⅓ hours. The liquid temperature is held between the 40° and 43° C. Only 0.143 cubic feet of hydrogen are evolved, as measured by a Wet Test Meter.

The catalyst is subsequently tested for acrylonitrile hydration activity by the method of Example 8. The catalyst is found to have an activity of 4.9, which is about 50% higher than the non-additive treated catalyst of Example 8(i) which was prepared without any exposure to any additive with the sodium hydroxide.

EXAMPLE 10

A Raney copper catalyst is prepared using the apparatus of FIG. 3. The preparation is conducted without the use of an additive in the activating sodium hydroxide.

The system is charged with 10.5 pounds of 50% copper/50% aluminum alloy particles of 6 to 8 mesh particle size. Approximately 36 gallons of water are charged to this system, and a circulation rate of 1.5 gpm is begun through the particle bed and continues throughout the sodium hydroxide addition step period. A total of about 31 pounds of a 50% aqueous sodium hydroxide solution is subsequently added to the water at a substantially uniform rate over an 8½ hour period. The circulation is continued until about 80 to 90 weight percent of the aluminum initially present is removed, as measured by hydrogen evolution. The catalyst is then first washed over wash water until a pH of less than 8 is achieved, and subsequently is screened on a 10 mesh screen.

This catalyst is charged to the apparatus of Example 6, and is run for an extended period at the following test conditions:

Temperature 220° F.
WHSV 1.5
Acrylonitrile to water weight ratio 35/65.

Initial activity of the catalyst is determined by the procedure of Example 8 to be approximately 2.8. After about 500 hours of operation, the activity is determined by the procedure of Example 8 to have declined to 1.3.

The catalyst of Example 6, which was prepared using gluconic acid, showed no decline in activity over a 500-hour test period when similarly evaluated, and in fact retained a higher percentage of its initial activity after over 1700 hours of operation than the non-additive treated catalyst of this Example retained after only 500 hours of operation, thereby demonstrating that a more useful catalyst is obtained with the use of gluconic acid as an additive in the activation period.

We claim:

1. In an improved process for preparing a Raney copper catalyst, said catalyst comprising from about 2 to 45 weight percent aluminum with the balance up to 100 weight percent being copper, the improvement which comprises contacting particles of a metal alloy comprised of copper and aluminum with an aqueous solution which had dissolved therein on a 100 weight percent total by-product free solution basis from greater than 0 to about 25 weight percent alkali metal hydroxide and at least one soluble polyhydroxylated carboxylic acid which has a solubility in water at least about 5 weight percent said acid being selected from the group consisting of (a) a compound of the formula:

$$HOCH_2 - (CHOH)_n - COOH$$

where n can range from 3 through 6 as well as the alkali metal salts, the ammonium salt, the lower alkanol esters and lactones thereof and (b) citric acid.

2. The process of claim 1 wherein said contacting being conducted at a temperature which is below about 80°C.

3. The process of claim 1 wherein said metal alloy is comprised of aluminum and copper in a weight ratio of from about 70:30 to 30:70 aluminum to copper in the form of particles ranging in size from about 0.001 to 0.5 inch.

4. The process of claim 1 wherein said solution comprises from greater than 0 to about 15 weight percent alkali metal hydroxide, from greater than 0 to about 5 weight percent polyhydroxylated compound and with the balance up to 100 weight percent thereof being water.

5. The process of claim 1 wherein said solution comprises from greater than 0 to about 5 weight percent alkali metal hydroxide, from about 0.01 to about 1.0 weight percent polyhydroxylated compound and with the balance up to 100 weight percent thereof being water.

6. The process of claim 1 wherein at least about 25 weight percent of the initially present aluminum in said alloy particles is removed during said contacting.

7. The process of claim 1 wherein said contacting is conducted for a time ranging from about ½ to 30 hours.

8. The process of claim 1 wherein before said contacting with said solution said alloy is preliminarily contacted with a preliminary composition which comprises an aqueous solution of at least on polyhydroxylated compound.

9. The process of claim 8 wherein said preliminary composition comprises from greater than 0 to about 25 weight percent of said polyhydroxylated compound with the balance up to 100 weight percent on a total composition basis being water.

10. The process of claim 9 wherein said preliminary composition comprises from greater than 0 to about 5 weight percent polyhydroxylated compound with the balance up to 100 weight percent on a total composition basis being water.

11. The process of claim 1 wherein said Raney copper catalyst is in the form of particles at least 90 weight percent of which range in average size from about 0.002 to 0.100 inch.

12. The process of claim 1 wherein said Raney copper catalyst is in the form of particles at least 90 weight percent of which range in average size from about 0.02 to 0.05 inch.

13. In an improved process for making a Raney copper catalyst, said catalyst comprising from about 2 to 45 weight percent aluminum with the balance up to 100 weight percent being copper, the improvement which comprises the step of activating a Raney copper catalyst through contact of aqueous alkali metal hydroxide with a metal alloy in particulate form comprising copper and aluminum thereby to remove from such alloy particles at least about 25 weight percent of the aluminum initially present therein, at least a portion of such contacting being conducted over a time interval of from ½ to 30 hours using an aqueous alkali metal hydroxide solution which additionally contains dissolved therein a polyhydroxylated hydrocarbon compound of the formula:

$$HOCH_2 - (CHOH)_n - COOH \qquad (1)$$

where n can range from 3 through 6 as well as the alkali metal salts, the ammonium salt, lower alkanol esters and lactones thereof.

14. In an improved process for preparing a Raney copper catalyst, said catalyst comprising from about 2 to 45 weight percent aluminum with the balance to 100 weight percent being copper, the improvement which comprises the steps of:

a. first contacting an aqueous solution of a polyhydroxylated compound with a group of metal alloy particles comprised of copper and aluminum, said polyhydroxylated compound having the formula:

$$HOCH_2 - (CHOH)_n - COOH \qquad (1)$$

where $n$ can range from 3 through 6 as well as the alkali metal salts, the ammonium salt, lower alkanol esters and lactones thereof,
   1. said solution containing about 0.01 to 1 weight percent of said polyhydroxylated compound in dissolved form,
   2. said group having an average particle size diameter in the range of from about 0.001 to 0.5 inch,
   3. said alloy having a copper to aluminum weight ratio of from about 30:70 to 70:30,
   4. said solution having a temperature in the range from about 0° to 80°C, and
 b. secondly contacting the resulting said group of alloy particles with an aqueous caustic solution,
   1. said aqueous solution containing greater than 0 to about 5 weight percent dissolved alkali metal hydroxide,
   2. said contacting being accomplished over a total time interval of from about ½ to 30 hours,
   3. said caustic solution being added gradually to said group over said time interval,
   4. the contact rate of starting caustic solution being added to said group during such contacting being from about 0.01 to 10 pounds caustic per pound of said starting group of alloy particles per hour,
   5. the total quantity of caustic so added being in the range of from about 0.5 to 25 pounds of caustic per pound of said starting group of particles,
   6. said solution and the resulting aqueous medium produced in such contacting each having a temperature in the range from about 0° to 80°C,
   7. said group being maintained in said contact with said solution of said polyhydroxylated compound during said contacting with said aqueous caustic solution by admixture of such respective solutions.

15. The process of claim 14 wherein time interval of said second contacting ranges from about 4 to 12 hours.

16. The process of claim 14 wherein said group of particles is confined to a reaction zone and said caustic solution is added into said reaction zone and said resulting medium is allowed to accumulate in said zone.

17. The process of claim 14 wherein said group of particles is confined to a reaction zone, and said caustic solution is first contacted with said group of particles in said zone and said resulting medium is gradually removed from said zone.

18. The process of claim 17 wherein said resulting medium is so removed at a volumetric rate which is about equal to the rate of addition of said caustic solution.

19. The process of claim 17 wherein substantially 100 weight percent of said so removed, resulting medium is recycled back into contact with said group of particles.

20. The process of claim 19 wherein said so recycled medium is admixed with at least a portion of said caustic solution before or during recycle contact with said group of particles.

21. The process of claim 19 wherein less than 100 weight percent of said so removed, resulting medium is recycled back into contact with said group of particles and the balance up to 100 weight percent thereof remains removed from said reaction zone.

22. The process of claim 1 wherein said hydroxylated hydrocarbon compound is selected from the group consisting of gluconic acid, its alkali metal and ammonium salts, and lower alkanol esters and lactones thereof.

23. The catalyst prepared by the process of claim 1.

24. The process of claim 14 wherein said polyhydroxylated compound is gluconic acid.

25. The catalyst prepared by the process of claim 14.

26. The catalyst prepared by the process of claim 22.

27. The catalyst prepared by the process of claim 24.

* * * * *